US007722306B2

(12) United States Patent
Yokobori et al.

(10) Patent No.: US 7,722,306 B2
(45) Date of Patent: May 25, 2010

(54) IMAGE FORMING SYSTEM

(75) Inventors: Jun Yokobori, Sagamihara (JP); Shinya Tanigami, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 177 days.

(21) Appl. No.: 11/604,356

(22) Filed: Nov. 27, 2006

(65) Prior Publication Data

US 2007/0172279 A1 Jul. 26, 2007

(30) Foreign Application Priority Data

Jan. 26, 2006 (JP) ............................ 2006-017341

(51) Int. Cl.
*G03G 15/00* (2006.01)
*B42C 13/00* (2006.01)
*B42C 11/02* (2006.01)
*G06K 15/00* (2006.01)

(52) U.S. Cl. ............................ 412/11; 412/14; 412/19; 358/1.18; 399/408

(58) Field of Classification Search ..................... 412/4, 412/11, 13, 14, 19; 358/1.18; 399/408
See application file for complete search history.

(56) References Cited

U.S. PATENT DOCUMENTS 3,928,119 A * 12/1975 Sarring ....................... 156/484
5,735,659 A * 4/1998 Kosasa et al. .................. 412/9
6,000,894 A * 12/1999 Suzuki et al. ................. 412/11
6,171,044 B1 * 1/2001 De La Torre ................... 412/4
6,206,358 B1 * 3/2001 Yamaguchi et al. ...... 270/52.02
6,352,252 B1 * 3/2002 Schmucker et al. ...... 270/58.07
6,447,230 B1 * 9/2002 Takai et al. ................... 412/14
6,685,416 B2 * 2/2004 Itoh et al. ..................... 412/37
6,825,949 B1 * 11/2004 Hirai ......................... 358/1.18

* cited by examiner

*Primary Examiner*—Dana Ross
*Assistant Examiner*—Kyle Grabowski
(74) *Attorney, Agent, or Firm*—Finnegan, Henderson, Farabow, Garrett & Dunner, L.L.P.

(57) ABSTRACT

An image forming system including a binding system section that generates a stack of sheets by accumulating a plurality of sheets and that binds the sheets by wrapping the stack of sheets with a cover sheet in the shape of a horizontal U, the image forming system having: a measurement section to measure the thickness of the stack of sheets; a spine cover width determining section to determine a spine cover width in the cover sheet based on the thickness of the stack of sheets measured by the measurement section; and an image forming section to form on the cover sheet a front cover image and a back cover image separating them by a spacing equal to the spine cover width.

9 Claims, 19 Drawing Sheets

IMAGE FORMING SYSTEM

This application is based on Japanese Patent Applications No. 2006-17341 filed on Jan. 26, 2006 in Japanese Patent Office, the entire content of which is hereby incorporated by reference.

BACKGROUND OF THE INVENTION

1. Field of the Invention

The present invention relates to an image forming system that binds a stack of sheets by wrapping it with a cover page in the shape of a horizontal U.

2. Description of the Related Art

Binding apparatuses are known (see Patent Document 1) that carry out simple binding of a stack of a plurality of sheets on which images have been formed by a copying machine, or a printer, etc., by wrapping the stack of sheets with a cover page bent in the shape a horizontal U. An outline of a general binding technology is as follows. Firstly, a stack of sheets is prepared by accumulating and aligning a plurality of sheets on which images have been formed. Next, an adhesive such as gum, etc., is coated on one surface of the accumulated and aligned stack of sheets. Further, the cover sheet is conveyed and made to stop at a prescribed position, and the cover sheet is adhered to the surface of the stack of sheets on which the adhesive has been coated. Using this procedure, the stack of sheets and the cover sheet become bonded thereby forming a book.

An example of a book formed by a binding apparatus is shown in FIG. 1. FIG. 1(*a*) shows the state in which the cover sheet S2 has not been folded, and FIG. 1(*b*) shows the state in which the cover sheet S2 has been folded. S3 is constituted by the plurality of sheets S1 and the cover sheet S2, and is the form in which the cover sheet S2 wraps the stack of sheets S1 in the form of a horizontal U. In the following, S3 is called a wrapped book. In the final form of the wrapped book S3, the side edge part S1E of the sheets S1 and the side edge part S2E of the cover sheet S2 are aligned. The cove sheet S2 has, as is shown in FIG. 1(*a*), a front cover area a, a spine cover area b, and a back cover area c.

FIG. 2 shows a development drawing of the cover sheet S2. As is shown in FIG. 2, the front cover image G1 has been formed in the front cover area a, and a back cover image G2 has been formed in the back cover area c, and the front cover image G1 and the back cover image G2 are separated at a spacing X. The spine cover area b is present in between the front cover area a and the back cover area c, and the width of the spine cover area b (hereinafter referred to as the spine cover width) varies depending on the number of sheets S1 in the book. In other words, it is necessary to determine exactly the spine cover width in order to form the front cover image G1 and the back cover image G2 at accurate positions on the cover sheet S2.

As a method of determining the spine cover width, there is the method disclosed in Patent Document 2. In the technology described in Patent Document 2, the size of the spine cover part of the cover sheet is calculated using the data related to the thickness of one sheet, the data related to the toner thickness based on the amount of toner used per sheet, and the number of sheets.

Patent Document 1: Japanese Unexamined Patent Application Open to Public Inspection No. 2005-335262

Patent Document 2: Japanese Unexamined Patent Application Open to Public Inspection No. Hei 10-167557

However, since the spine cover width is affected by the variations in the thickness of one sheet of paper, the amount of curling of the sheet, etc., in the method of calculating it based on the data described in Patent Document 2 and the number sheets, it is not possible to determine exactly the spine cover width, and it is not possible to form the cover sheet image, etc., at an accurate position in the cover sheet.

SUMMARY

Therefore, the purpose of the present invention is to provide an image forming system and an image forming apparatus that increase the accuracy of the spine cover width, and can form the front cover image and the back cover image at more appropriate positions in the cover sheet.

In order to achieve the above objective, an image forming system according to one preferred embodiment of the present invention is an image forming system including a binding section that generates a stack of sheets by accumulating a plurality of sheets and that binds by wrapping the stack of sheets with a cover sheet in the shape of a horizontal U, the image forming system comprising:

a measurement section to measure the thickness of the stack of sheets;

a spine cover width determining section to determine a spine cover width in the cover sheet based on the thickness of the stack of sheets measured by said measurement section; and an image forming section to form on the cover sheet a front cover image and a back cover image separating them by a spacing equal to said spine cover width.

Further, an image forming system according to another preferred embodiment of the present invention is an image forming system including a binding section that generates a stack of sheets by accumulating a plurality of sheets and that binds by wrapping the stack of sheets with a cover sheet in the shape of a horizontal U, the image forming system comprising:

an input section to input a value of a spine cover width in the cover sheet;

a measurement section to measure the thickness of the stack of sheets;

a spine cover width determining section to determine a spine cover width in the cover sheet in an input mode in which the spine cover width determining section determines the spine cover width in the cover sheet based on the value of the spine cover width inputted by said input section or in a measurement mode in which said spine cover width determining section determines the spine cover width based on the thickness of the stack of sheets measured by said measurement section;

an image forming section to form on the cover sheet a front cover image and a back cover image separating them by a spacing equal to the spine cover width; and a control section to carry out switching between the input mode and the measurement mode of said measurement section when a plurality of books are to be bound, wherein said control section controls spine cover determining operation by said spine cover width determining section to operate in the input mode at least for the first book of the plurality of books to be bound.

Further, an image forming system according to yet another preferred embodiment of the present invention is an image forming system including a binding section that generates a stack of sheets by accumulating a plurality of sheets and that binds by wrapping the stack of sheets with a cover sheet in the shape of a horizontal U, the image forming system comprising:

an input section to input a value of a spine cover width in the cover sheet;

a measurement section to measure the thickness of the stack of sheets;

displaying section to display the value of the spine cover width that has been input by said input section and the result of the measurement of the thickness of the stack of sheets measured by said measurement section;

a spine cover width determining section to determine a spine cover width in the cover sheet;

a control section to control said measurement section to measure the thickness of the stack of sheets, and to control said displaying section to display the value of the spine cover width in the cover sheet inputted by said input section and the thickness of the stack of sheets measured by said measuring section after the measurement, and when a value of the spine cover width is inputted again by said input section or when the value of the spine cover width in the cover sheet that has already been inputted by said input section after displaying the value of the spine cover width in the cover sheet inputted by said input section, said control section controls said spine cover determining section to determine the spine cover width in the cover sheet based on the value of the spine cover width inputted again or the value of the spine cover width in the cover sheet that has already been inputted; and an image forming section to form on the cover sheet a front cover image and a back cover image separating them by a spacing equal to the spine cover width in the cover sheet determined by said determining section.

According to an image forming system of the present invention, it is possible to increase the accuracy of the spine cover width, and to form the front cover image and the back cover image at more appropriate positions in the cover sheet.

DETAILED DESCRIPTION OF THE PREFERRED EMBODIMENTS

Figure 3:
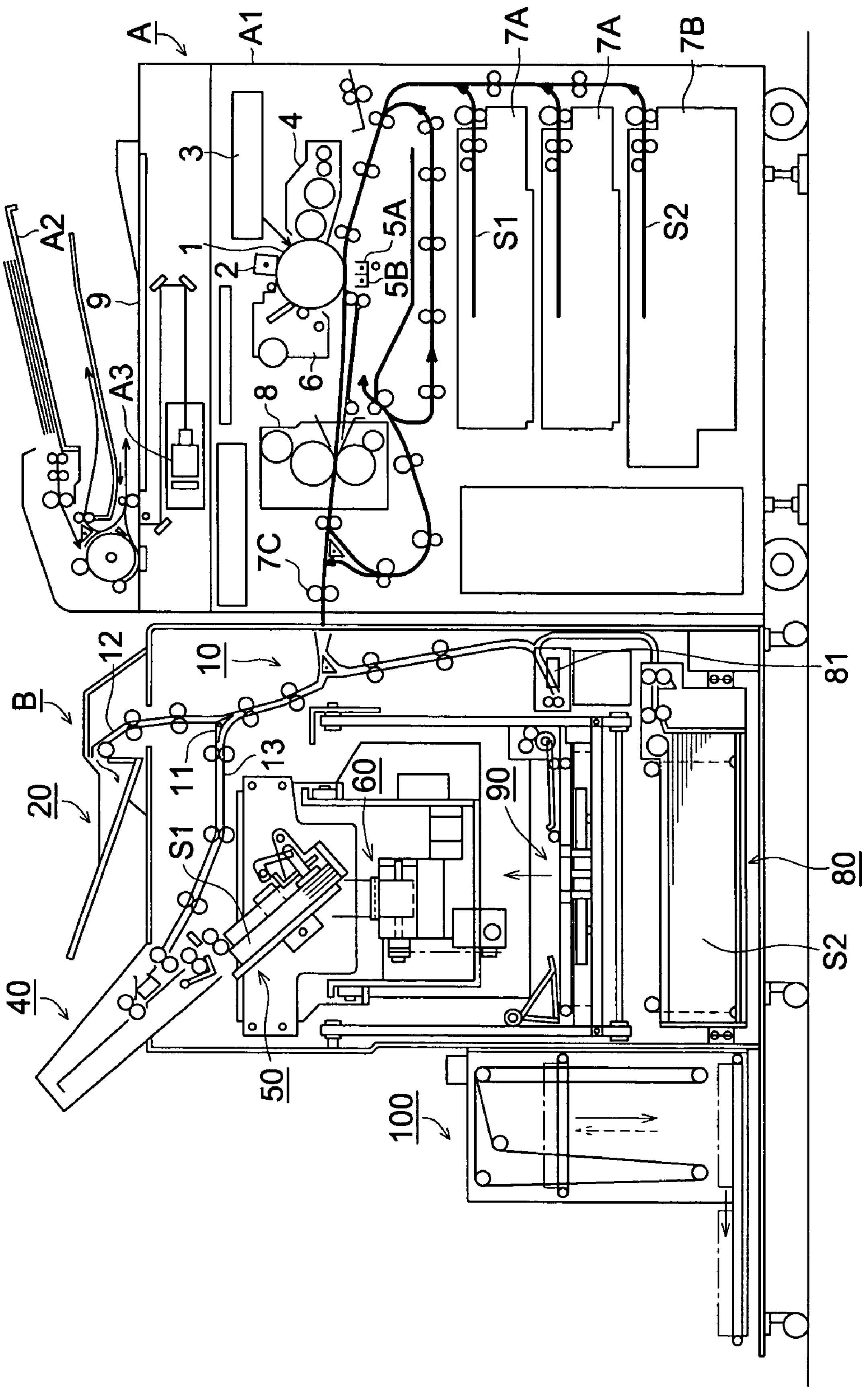
FIG. 3 is a center cross-section diagram of an image forming apparatus.

FIG. 3 is a center cross-section diagram of an image forming apparatus.

The image forming system has an image forming apparatus (image forming section) A and a binding apparatus (binding section) B.

The image forming apparatus A forms images on sheets using the electro-photographic method, and has an image forming section A1, an original document conveying section A2, and an image reading section A3. In the image forming section A1, a charging unit 2, an exposure unit 3, a developing unit 4, a transfer unit 5A, a separator unit 5B, and a cleaning unit 6 are placed around a drum-shaped photoreceptor body 1, and each of the processes of charging, exposure, developing, and transferring are carried out, and toner images are formed on the sheets S1 and the cover sheet S2. The sheets S2 that are the intermediate sheets when wrapped by the cover sheet S2 if binding is done are stored in two sheet feeding trays 7A, and the cover sheets 32 are stored in the sheet feeding tray 7B and in the cover sheet storage section 80 of the binding apparatus B. One sheet each of the sheets S1 and the cover sheet S2 are discharged at a time from the sheet feeding trays 7A and 7B and are transported to the image forming section A1. The sheet S1 and the cover sheet S2 on which toner images have formed are subjected to fixing process by passing through the fixing unit 8. The sheet S1 and the cover sheet S2 that have been fixed are discharged to outside the image forming apparatus A by the sheet discharge rollers 7C.

The binding apparatus B accumulates a plurality of sheets S1 sent from the image forming apparatus A thereby making a stack of sheets, affixes a cover sheet S2 on this stack of sheets by wrapping the stack of sheets with the cover sheet S2 in the shape of a horizontal U thereby preparing a book. The binding apparatus B has a sheet reversing section 40, an accumulation section 50, a coating section 60, and a joining section 90 that affixes a cover sheet on the stack of sheets, and, in addition, it also has a conveying section 10, a sheet discharge tray 20, a cover sheet storage section 80, and a book discharging section 100. The sheets S1 conveyed from the image forming apparatus A to the binding apparatus B are either discharged to the sheet discharge tray 20 via the sheet discharge path 12 or are conveyed to the sheet reversing section 40 by the selection gate 11 provided in the conveying section 10. The sheets S1 are discharged to the sheet discharge tray 20 when no book binding is to be done in the binding apparatus B. When a book binding operation is to be made in the binding apparatus B, the sheets S1 are conveyed to the sheet reversing section 40 via the conveying path 13, and after being switched back in the sheet reversing section 40, they are conveyed to the accumulation section 50. In the accumulation section 50, a set number of sheets S1 is accumulated, the accumulation section rotates when the number of sheets S1 accumulated reaches a set number, and the stack of sheets S1 is held in an almost vertical position. Next, an adhesive material is coated by the coating section 60 on the bottom surface of the stack of sheets S1 which is the spine part of the book to be prepared, and a cover sheet S2 is contacted with and adhered to the stack of sheets S1. The wrapped book S3 prepared by adhering the cover sheet S2 to the stack of sheets S1 is discharged to the book discharging section 100.

Figure 4:
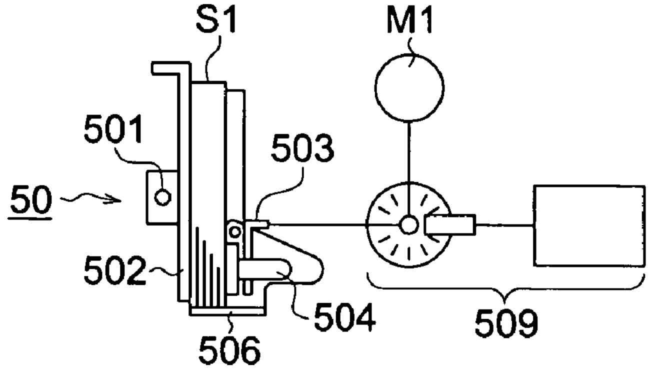
FIG. 4 is an explanatory diagram showing the process of coating an adhesive on the stack of sheets S1.
Figure 4:
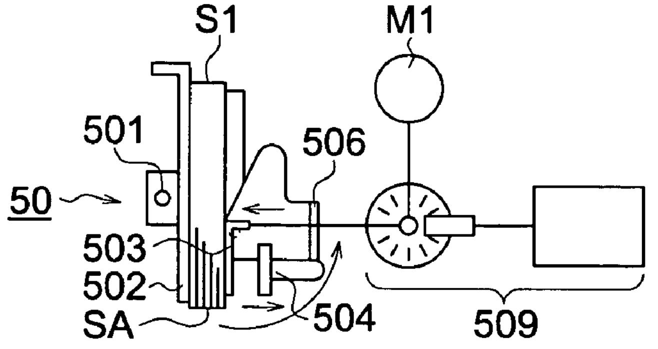
Figure 4:
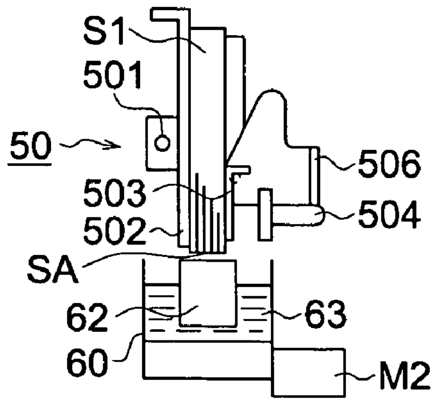
Figure 4:
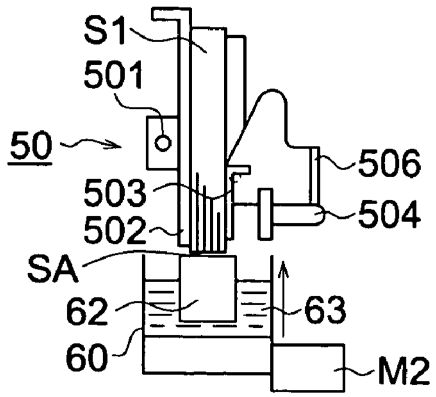

FIG. 4 shows the process of coating an adhesive on the stack of sheets S1.

The second gripping member 503 is moved towards the sheet S1 by the motor M1 which is the moving means, and when the second gripping member 503 pushes against the sheet S1 with a constant pressure, the increase in the driving torque of the motor M1 is detected by the driving torque detection sensor (not shown in the figure), and the movement of the second gripping member 503 is stopped. Because of this configuration, the stack of sheets S1 is gripped strongly between the first gripping member 502 and the second gripping member 503. The amount of movement of the second gripping member is measured by an encoder, and is stored in a storage section such as a RAM, etc. The detailed contents related to the method of measuring the thickness of a stack of sheets S1 are described later.

At the stage when the stack of sheets S1 is gripped by the first gripping member 502 and the second gripping member 503, the receiving plate 506 is rotated by 90 degrees by a driving mechanism (not shown in the figure), and recedes as is shown in FIG. 4(*b*). At the stage in which the receiving plate 506 has receded, the coating roller 62 and the bottom surface SA of the stack of sheets S1 are not in contact with each other (see FIG. 4(*c*)).

Next, as is shown in FIG. 4(*d*), the coating section 60 in which is stored the adhesive material 63 rises up and the coating roller 62 comes into contact with the bottom surface SA of the stack of sheets S1, and the adhesive material 63 is coated on the bottom surface SA of the stack of sheets S1 because of the coating section 60 moving along the bottom surface SA of the stack of sheets S1. The coating roller 62 is driven by the motor M2.

Next, the method of making settings for the book binding operation in the operation section are described below referring to FIG. 5 to FIG. 8.

FIG. 5 to FIG. 8 are the detailed drawings of the display screen in the operation section A4.

Figure 1A:
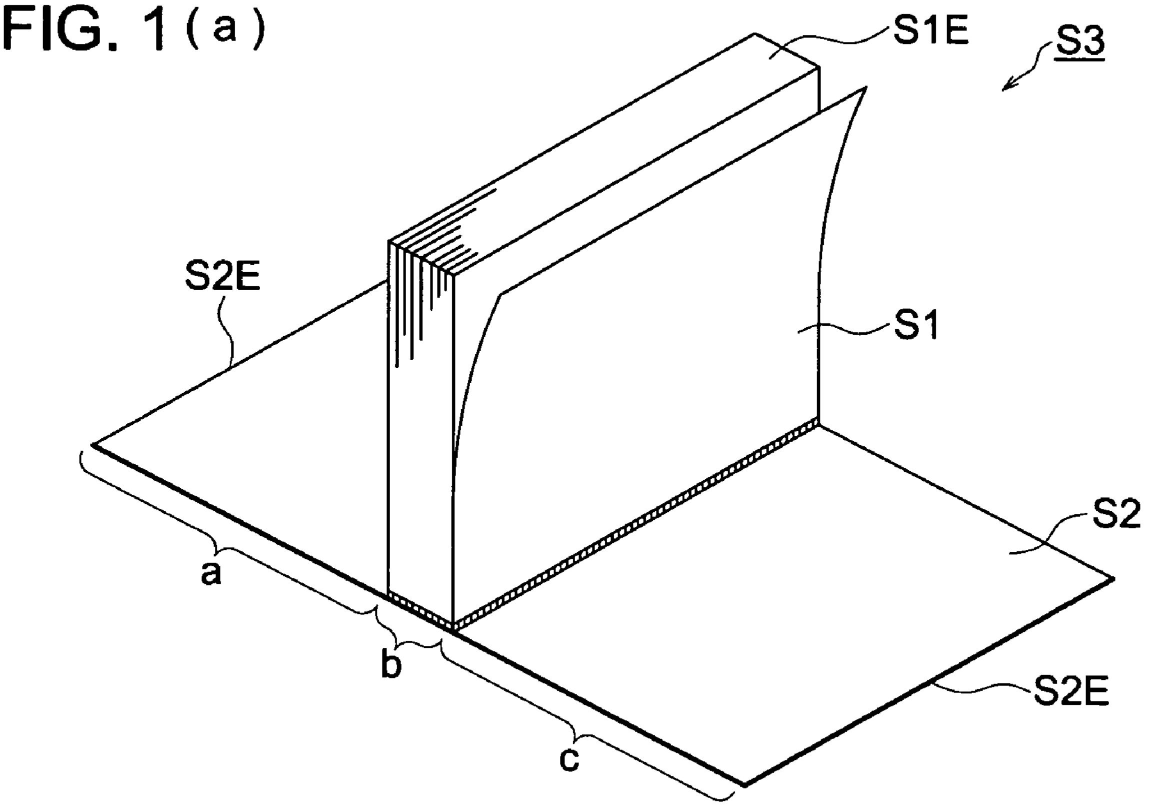
FIG. 1 is a detailed diagram of the wrapped book S3.
Figure 1B:
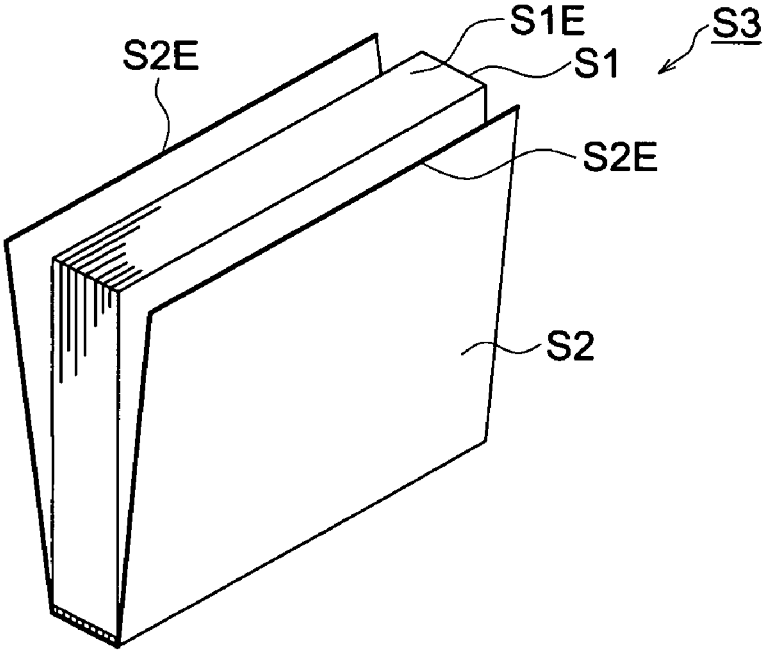
Figure 5:
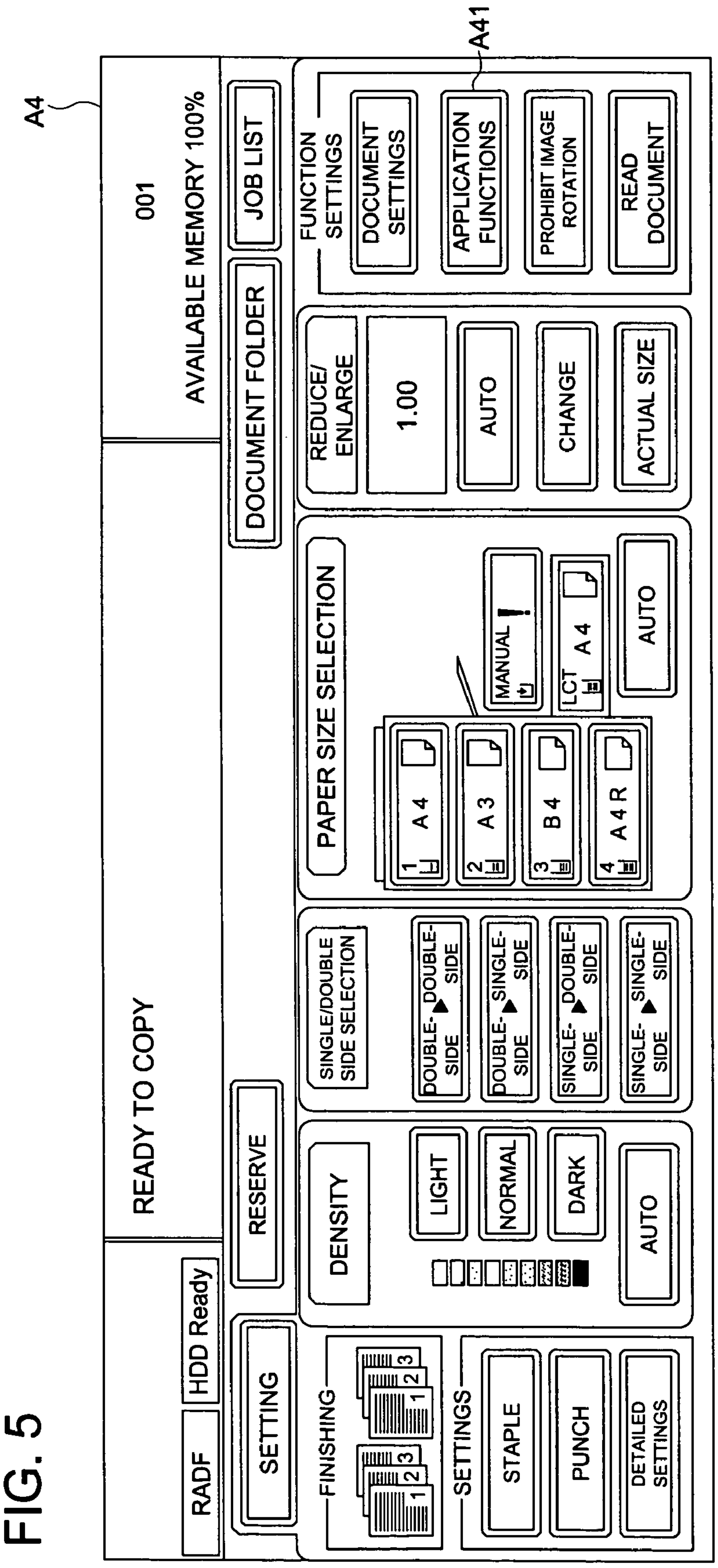
FIG. 5 is a detailed diagram of the display screen in the operation section A4.
Figure 6:
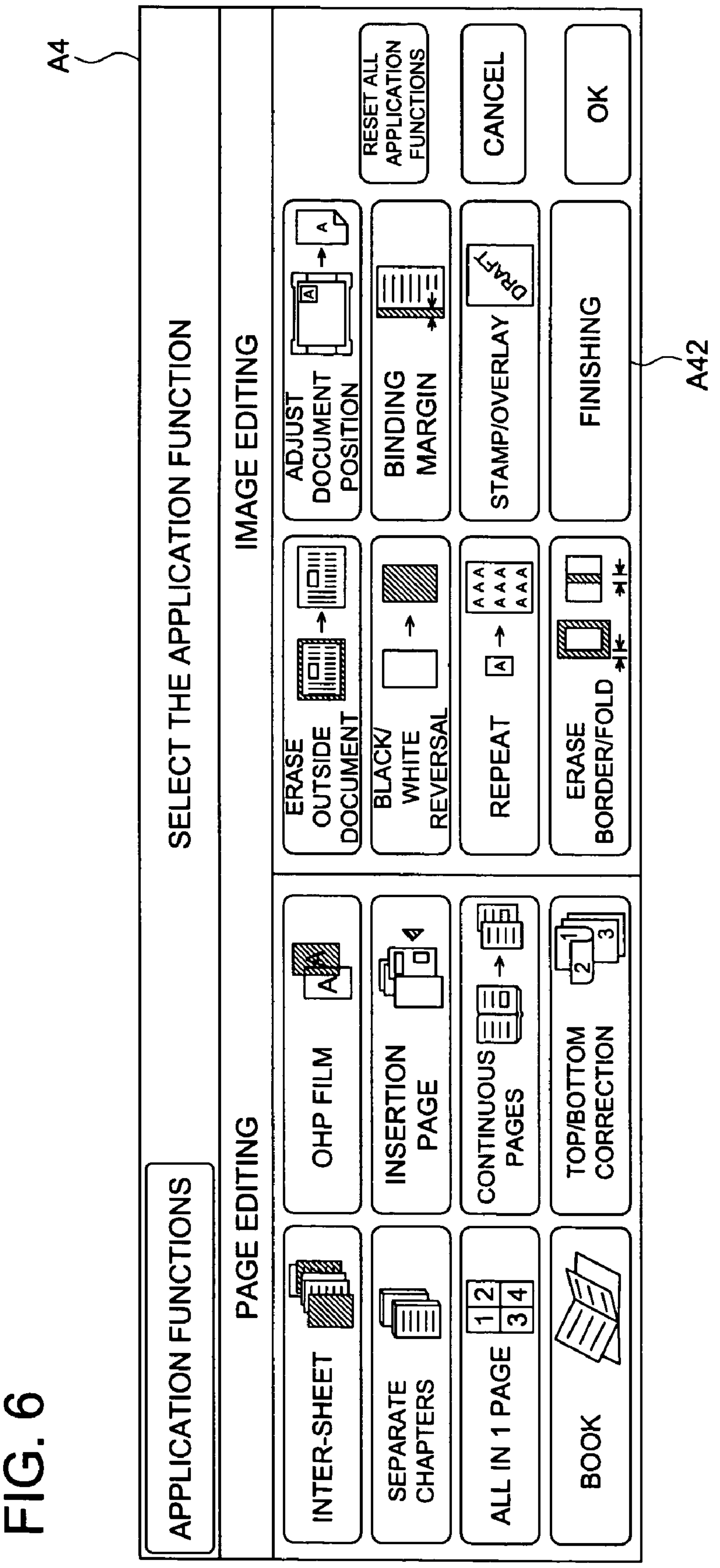
FIG. 6 is a detailed diagram of the display screen in the operation section A4.
Figure 7:
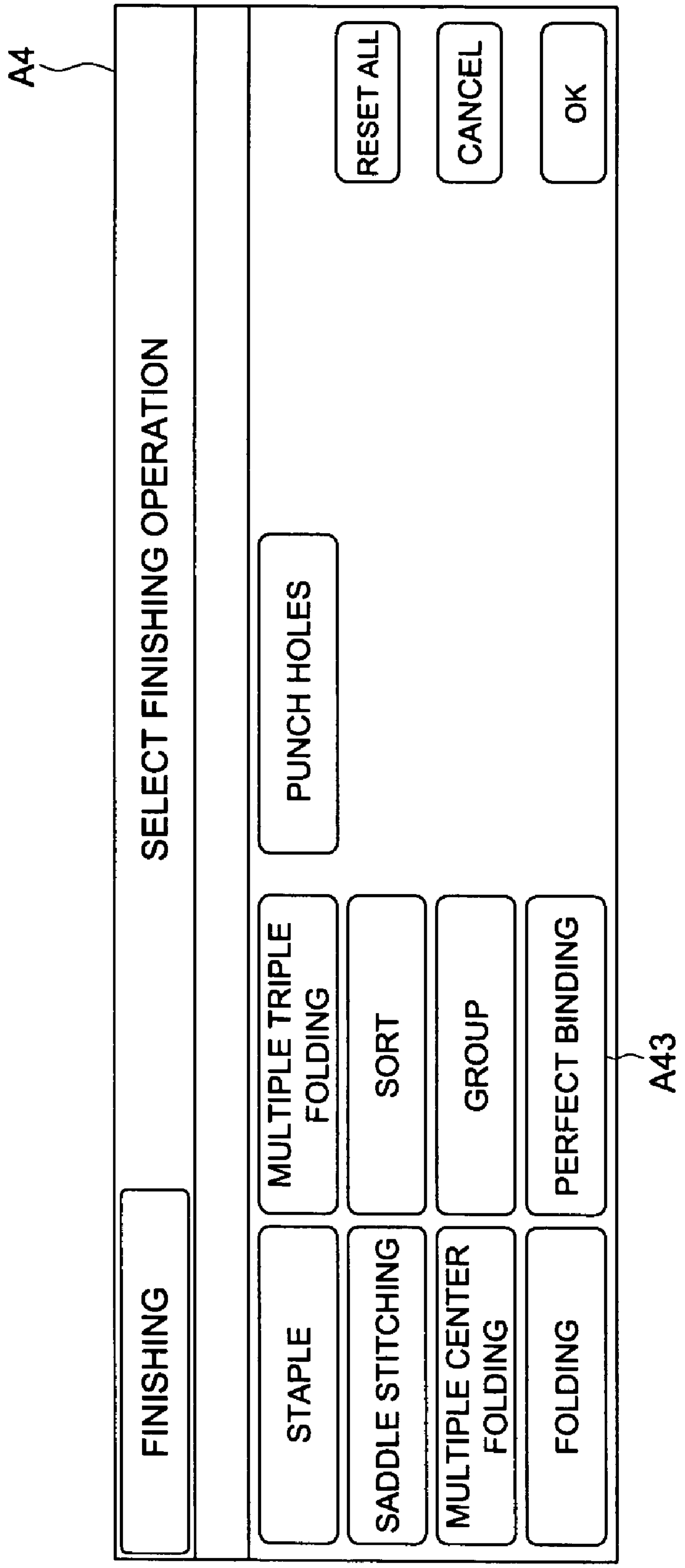
FIG. 7 is a detailed diagram of the display screen in the operation section A4.
Figure 8:
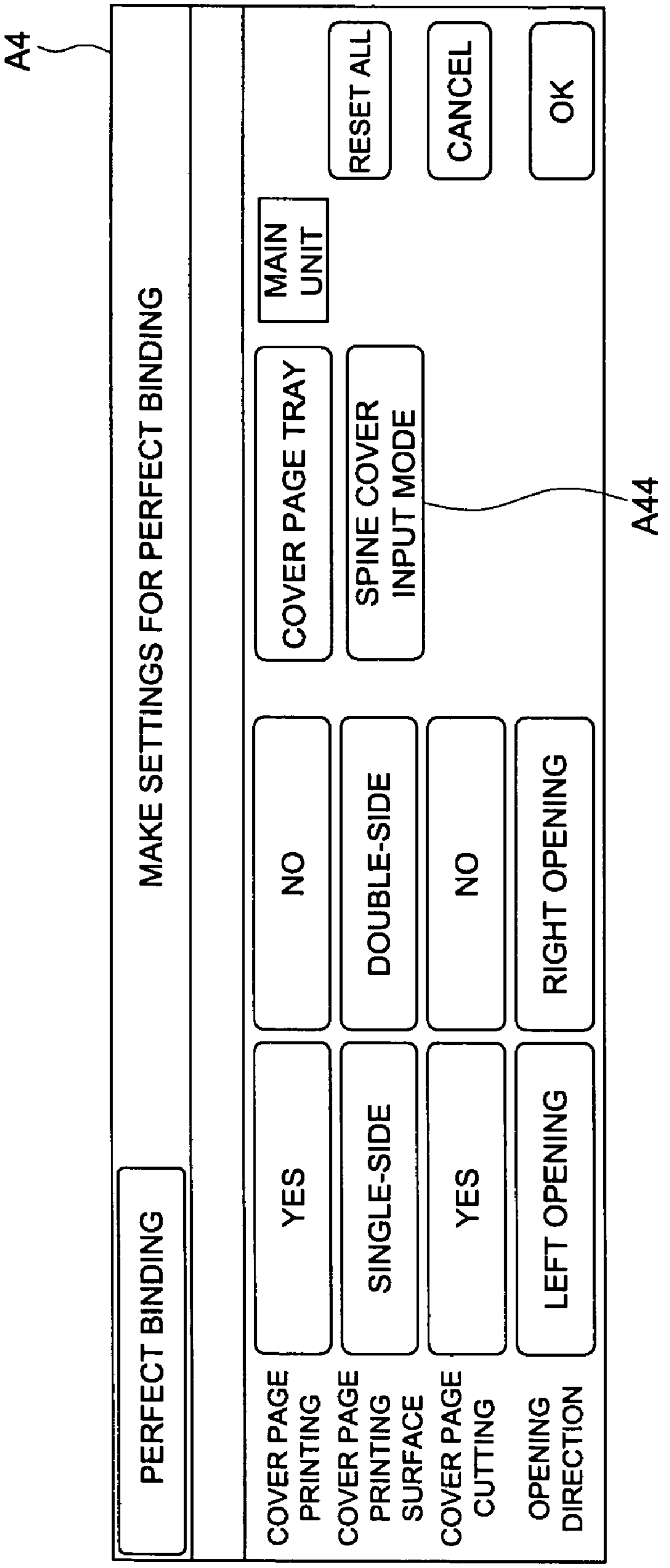
FIG. 8 is a detailed diagram of the display screen in the operation section A4.

FIG. 5 shows the basic screen of the operation section A4 that is the display section and the input section. When carrying out a book binding operation, to begin with the application function button A41 is pressed. When the application function button A41 is pressed, the settings screen related to the application function is displayed as shown in FIG. 6, and next the finishing operation button A42 is pressed in the settings screen. When the finishing operations button A42 is pressed, the settings screen related to the finishing operations is displayed as shown in FIG. 7. When wanting to carry out book binding operation of wrapping the cover sheet S2 over the sheets S1 as is shown in FIG. 1, the PERFECT BINDING button A43 is to be pressed in the settings screen. When the wrap stitching button A43 is pressed, the settings screen related to wrap stitching is displayed as is shown in FIG. 8, and the settings are completed when the presence or absence of cover sheet printing, cover sheet printing surface, presence or absence of cover sheet cutting, etc., are set and the OK button is pressed in this screen.

Figure 9:
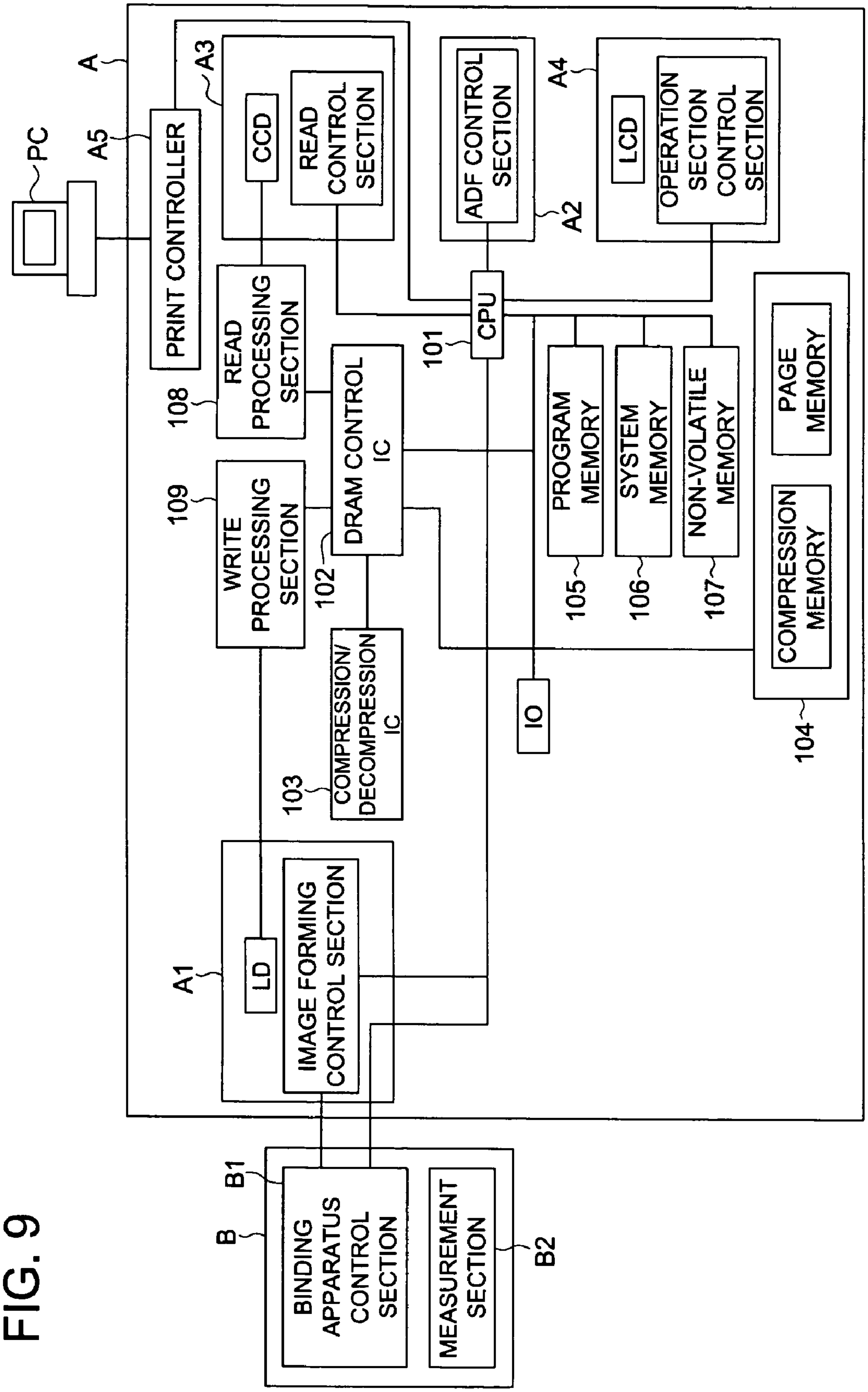
FIG. 9 is a block diagram of the control section in the image forming system.

FIG. 9 is a block diagram of the control section in the image forming system.

The image forming apparatus A is connected to PC which is a terminal such as a personal computer and to the binding apparatus B. When the image is input to the print controller A5 from the PC via communication lines such as a LAN, etc., the CPU 101, which is the control section and the spine cover determining section, causes the DRAM control IC 102 and the compression and decompression IC 103 to operate, and the input image is stored in the compression memory within the image memory 104. On the other hand, if the image is input after an original document is read in by the image reading section A3, the input image is processed by the read processing section 108, and is then stored in a similar manner in the compression memory within the image memory 104. When forming the stored images on a sheet S1, etc., the compressed image is decompressed by the compression and decompression IC 103 and is expanded in the page memory within the image memory 104. Next, based on the image memory expanded in the page memory, the CPU 101 controls the image formation control section within the image forming section A1, and the image is formed on the sheet S1, etc. Apart from the image memory 104, the CPU 101 is connected to a program memory 105 that stores the programs carrying out the sequence of operations in the image forming system, and to a system memory 106. The binding apparatus controlling section B1 of the binding apparatus B is connected to the image formation controls section of the image forming section A1, and carries out the book binding operations in relation to the image forming section A1.

Figure 10A:
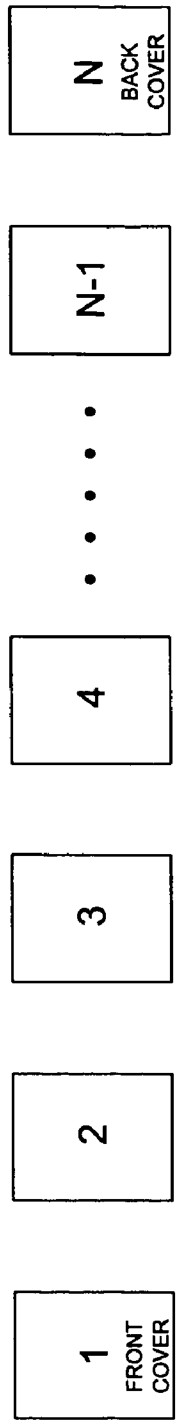
FIG. 10 is an explanatory diagram showing the relationship of outputting the images and the sheets S1 and the cover sheet S2 in the wrapped book S3.
Figure 10B:
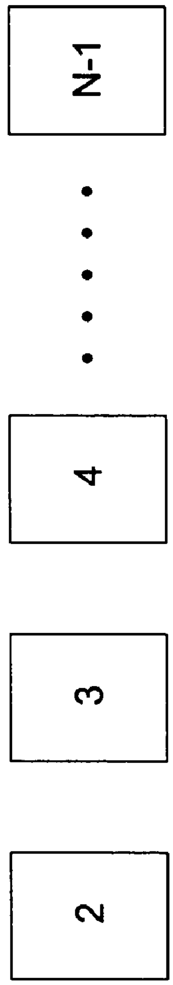
Figure 10C:
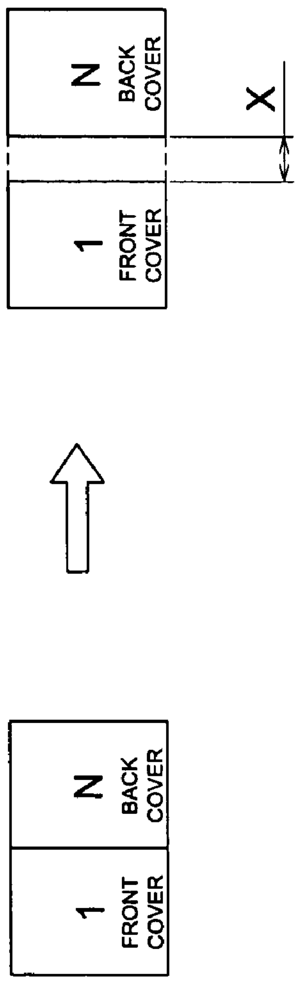

FIG. 10 is an explanatory diagram showing the relationship of outputting the images and the sheet S2 and the cover sheet S2 in the wrapped book S3.

Figure 2:
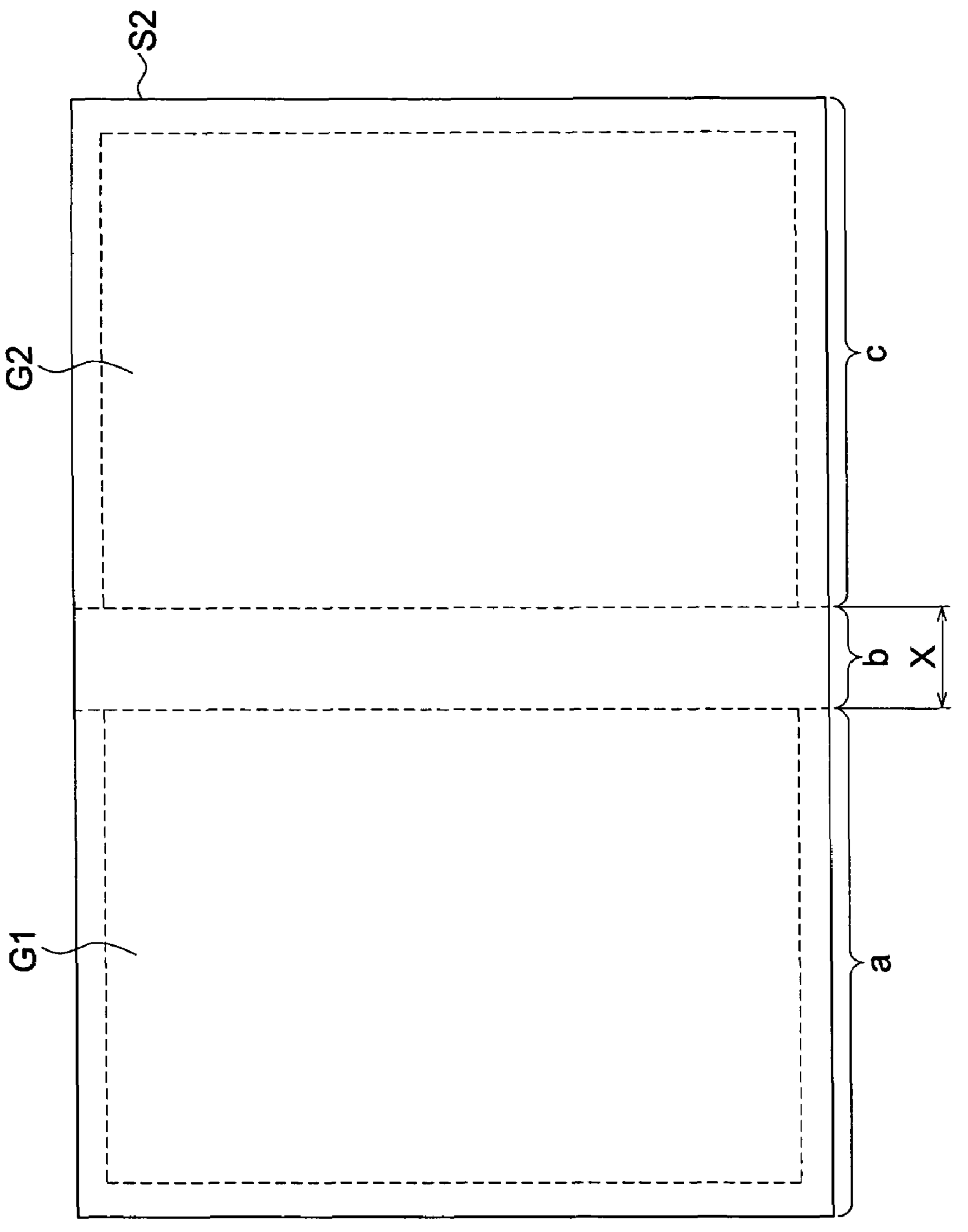
FIG. 2 is a development diagram of the cover sheet s2.

FIG. 10(*a*) expresses in units of one page the image data in one print job, and such image data is present for N number of pages in all. The first page corresponds to the font cover sheet image, and the last Nth page corresponds to the back cover sheet image. Therefore, the second page up to the (N-1)th page are output as the intermediate sheets S1 that are wrapped by the cover sheet S2 (see FIG. 10(*b*)). Next, the front cover sheet image of the first page and the back cover sheet image of the Nth page are output to the cover sheet S2. At the time of outputting the front cover sheet image and the back cover sheet image to the cover sheet S2, firstly, the front cover sheet image and the back cover sheet image compressed in the image memory 104 are decompressed, and are expanded in the page memory of the image memory 104 as is shown in FIG. 10(*c*). Since it is necessary to acquire a spine cover area in between the front cover sheet area and the back cover sheet area as is shown in FIG. 2, the spine cover width X determined by the CPU 101 is inserted in between the front cover sheet image and the back cover sheet image within the page memory. Thereafter, image formation is done on the cover sheet S2 based on this image information.

The spine cover width X in the cover sheet S2 corresponds to the thickness of the stack of sheets S1, and unless this spine cover width X is determined accurately, it is not possible to form the front cover sheet image and the back cover sheet image at an accurate position in the cover sheet S2. In view of this, it is desirable that the thickness of the stack of sheets S1 is measured, and the spine cover width X is determined based on the result of this measurement.

Figure 11:
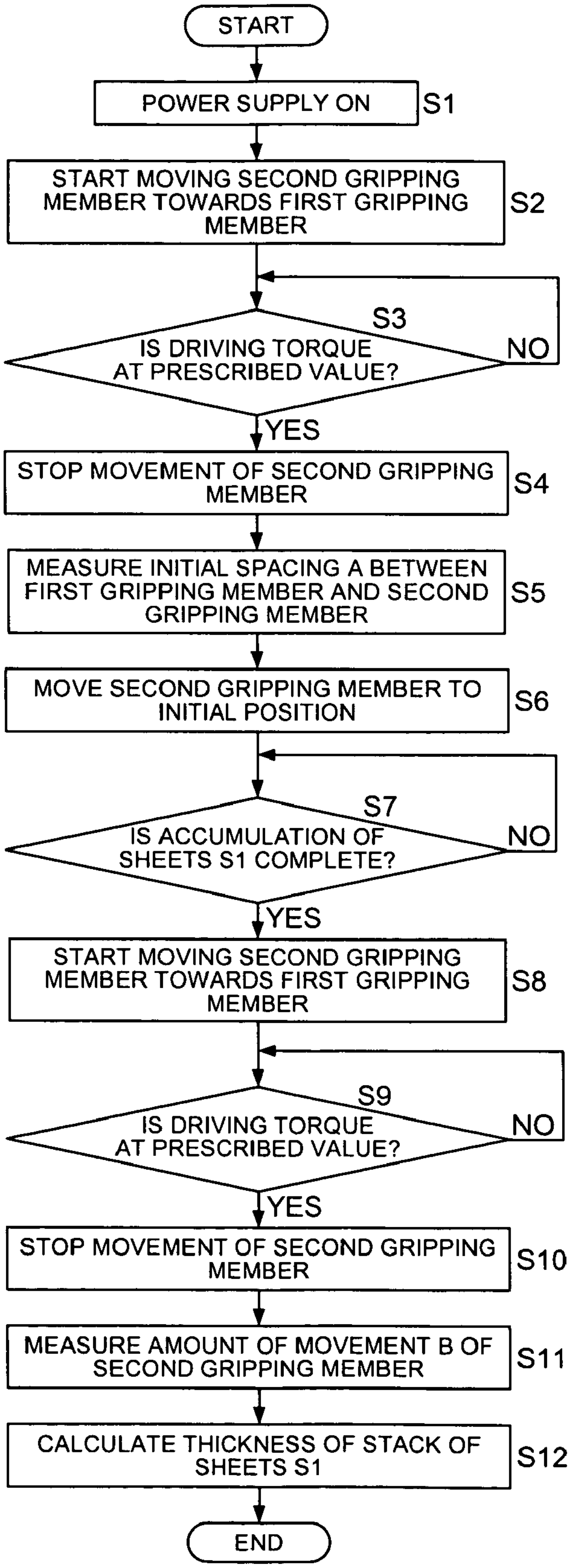
FIG. 11 is a flow chart showing the operation of measuring the thickness of the stack of sheets S1.
Figure 12:
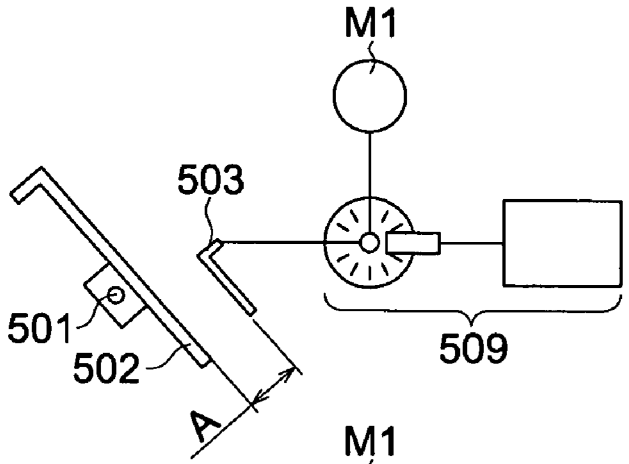
FIG. 12 is an explanatory diagram related to the operation of the first gripping plate 502 and the second gripping plate 503.
Figure 12:
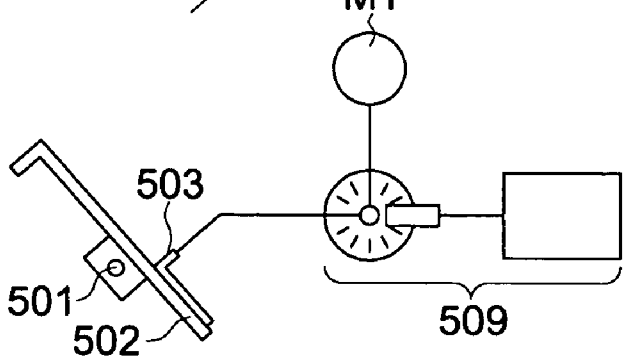
Figure 12:
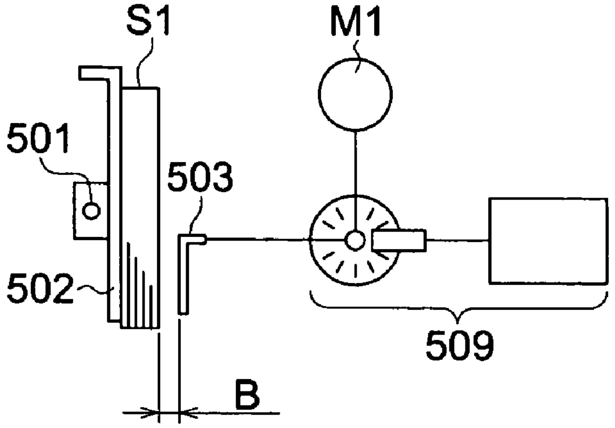
Figure 12:
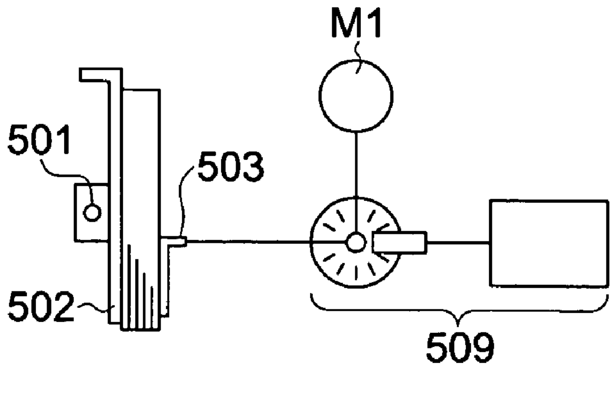

The operation of measuring the thickness of the stack of sheets S1 is explained here referring to FIG. 11 and FIG. 12.

FIG. 11 is a flow chart showing the operation of measuring the thickness of the stack of sheets S1, and FIG. 12 is an explanatory diagram related to the operation of the first gripping plate 502 and the second gripping plate 503. In order to make the method of measurement easy to understand, the unnecessary members have been omitted in FIG. 12.

FIG. 12(*a*) shows the state in which the stack of sheets S1 has not been accumulated between the first gripping member 502 and the second gripping member 503, and both gripping members are in the inclined condition. Further, the second gripping member 503 is at the initial position. In this condition, the measurement operation of measuring the initial spacing A between the first gripping member 502 and the second gripping member 503 is carried out. To begin with, when the power supplies of the binding apparatus, etc., within the image forming system area switched ON (Step S1 in FIG. 11), the program measuring the initial spacing A is read out from the program memory 105, and the CPU 101 executes the measurement operations. The CPU 101 drives the motor M1 and moves the second gripping member 503 towards the first gripping member 502 (Step S2 in FIG. 11). Next, it detects whether or not the drive torque of the motor M1 has reached a prescribed torque value using the driving torque detection sensor (not shown in the figure) (Step S3 in FIG. 11). When the drive torque of the motor M1 is detected to have reached the prescribed value, the movement of the second gripping member 503 is stopped (Step S4 in FIG. 11). When the movement of the second gripping member 503 has stopped, the first gripping member 502 and the second gripping member 503 are in the condition in which they are in contact with each other as is shown in FIG. 12(*b*). Since the amount of movement of the second gripping member has been measured by the encoder 509, this amount of movement becomes the initial spacing A between the first gripping member 502 and the second gripping member 503 (Step S5 in FIG. 11). The measured initial spacing A is stored in the system memory 106. When the measurement of the initial spacing is completed, the second gripping member 503 is returned to its initial position in order to accumulate the stack of sheets S1 (Step S6 in FIG. 11). Next, when the accumulation of the stack of sheets S1 is completed (Step S7 in FIG. 11), the unit is rotated with the shaft 501 as the center, so that the first gripping member 502 and the second gripping member 503 change from the inclined position to an almost vertical position while maintaining the initial spacing A between the two gripping members. Next, the program for measuring the thickness of the stack of sheets S1 is read out from the program memory 105, and the measuring operations by the measurement section B2 of the binding apparatus B are executed. To do this, to start with, the second gripping member 503 is moved towards the first gripping member 502 (Step S8 in FIG. 11). Next, a detection is made as to whether or not the drive torque of the motor M1 has reached a prescribed torque value using the driving torque detection sensor (Step S9 in FIG. 11). When the drive torque of the motor M1 is detected to have reached the prescribed value, the movement of the second gripping member 503 is stopped (Step S10 in FIG. 11). When the movement of the second gripping member 503 has stopped, the second gripping member 503 and the stack of sheets S1 are in the condition in which they are in contact with each other as is shown in FIG. 12(*d*). The amount of movement (B in FIG. 12(*c*)) of the second gripping member has been measured by the encoder 509 (Step S11 in FIG. 11). Next, the value of the initial spacing A that has already been measured is read out from the system memory 106, and the thickness of the stack of sheets S1 is calculated by subtracting the amount of movement B from the initial spacing A (Step S12 in FIG. 11). Although the method of measurement shown in FIG. 12 is one in which the thickness of the stack of sheets S1 is measured by moving the second gripping member 503 using a motor M1, it is not necessary to restrict to the mode of moving the second gripping member 503, but it is also possible to have a mode in which the first gripping member 502 is moved. In addition, it is also possible to have a mode of measuring the thickness of the stack of sheets S1 in which a motor and an encoder are connected to both the first gripping member 502 and the second gripping member 503 and the thickness of the stack of sheets S1 is measured by moving both the gripping members.

Further, in the present preferred embodiment, although the descriptions have been given that the program for measuring the initial spacing A is read out from the program memory 105 and the CPU 101 carries out the measurement operations, it is also possible to store the program for measuring the initial spacing A in the program memory (not shown in the Figure) that has been provided in the binding apparatus control section B1 of the binding apparatus B, and the program is read out from that program memory, and the measurement operations are carried out by the binding apparatus control section B1.

Figure 13:
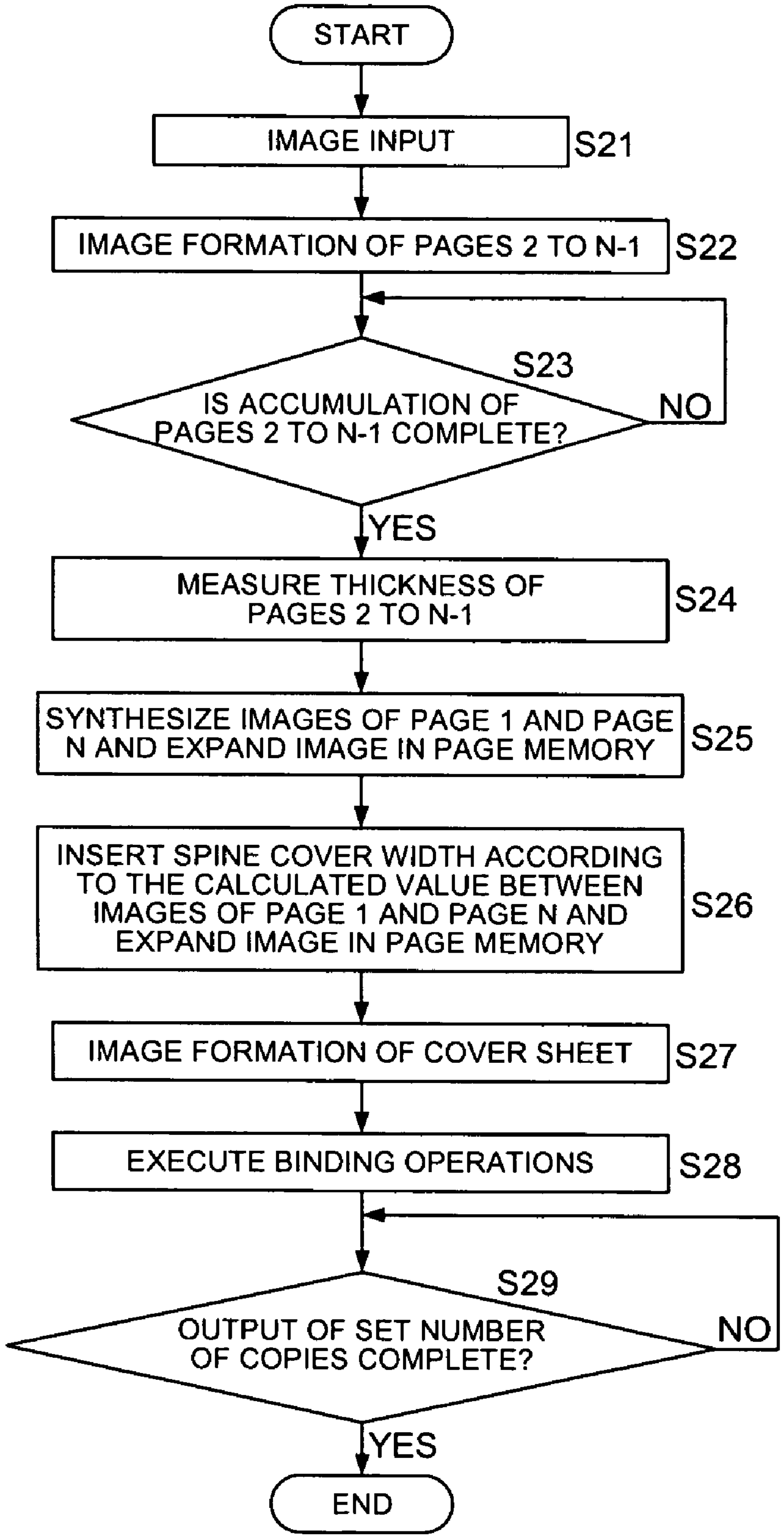
FIG. 13 is a flow chart describing the operation of determining the spine cover width.

Next, the operation of determining the spine cover width is described using the flow chart shown in FIG. 13.

To begin with, the image is input from a PC, etc. (Step S21), and when all the image data in one print job are received, the images of pages 2 to N-1 are formed on the sheets S1 (Step S22). Next, a judgment is made as to whether or not the sheets S1 for the pages 2 to N-1 have been accumulated in the accumulation section 50 (Step S23), and when it is judged that the accumulation has been completed (Step S25), the thickness of the stack of sheets S1 is measured (Step S24) using the measurement method described regarding FIG. 11 and FIG. 12. Next, the images of page 1 and page N are synthesized and expanded in the page memory (Step S25), and a spine cover width according to the thickness of the stack of sheets S1 calculated in Step S12 is inserted (Step S26). For this spine cover width, it is possible to take a value equal to the thickness of the stack of sheets S1 as the spine cover width in the cover sheet S2, or else, it is possible to take as the spine cover width a value obtained by adding to the measured thickness of the stack of sheets S1 an amount corresponding to the thickness of the cover sheet S2 (for example, 0.1 mm to 2 mm), and if the spine cover width is determined in this manner, in the final condition of the wrapped book S3, the side edge part S1E of the sheets S1 and the side edge part S2E of the cover sheet S2 will be aligned. In the condition in which the spine cover width has been inserted, the image to be formed on the cover sheet S2 will have become complete, and the image formation of this image is carried out on the cover sheet S2 (Step S27). Next, the binding operations of coating the adhesive material, etc., are carried out (Step S28). The sequence of operations is ended when the output has been completed for the set number of books (Step S29).

As has been explained above, by measuring the thickness of the stack of sheets, and by determining the spine cover width according to the result of that measurement, it is possible to form the front cover sheet image and the back cover sheet image at accurate positions on the cover sheet S2.

However, according to the method of measurement explained regarding FIG. 11 and FIG. 12, although it is possible to determine accurately the spine cover width, since it is not possible to measure the thickness of the stack of sheets until the image formation on all the sheets S1 has been completed, it is not possible to carry out the image formation operations on the cover sheet S2, and hence it is not possible to achieve improvement in the productivity of producing wrapped books S3. Considering this point, it is desirable to execute the input mode at least for the first copy of the book wherein the spine cover width is determined based on the value of the spine cover width that has been input.

Figure 14:
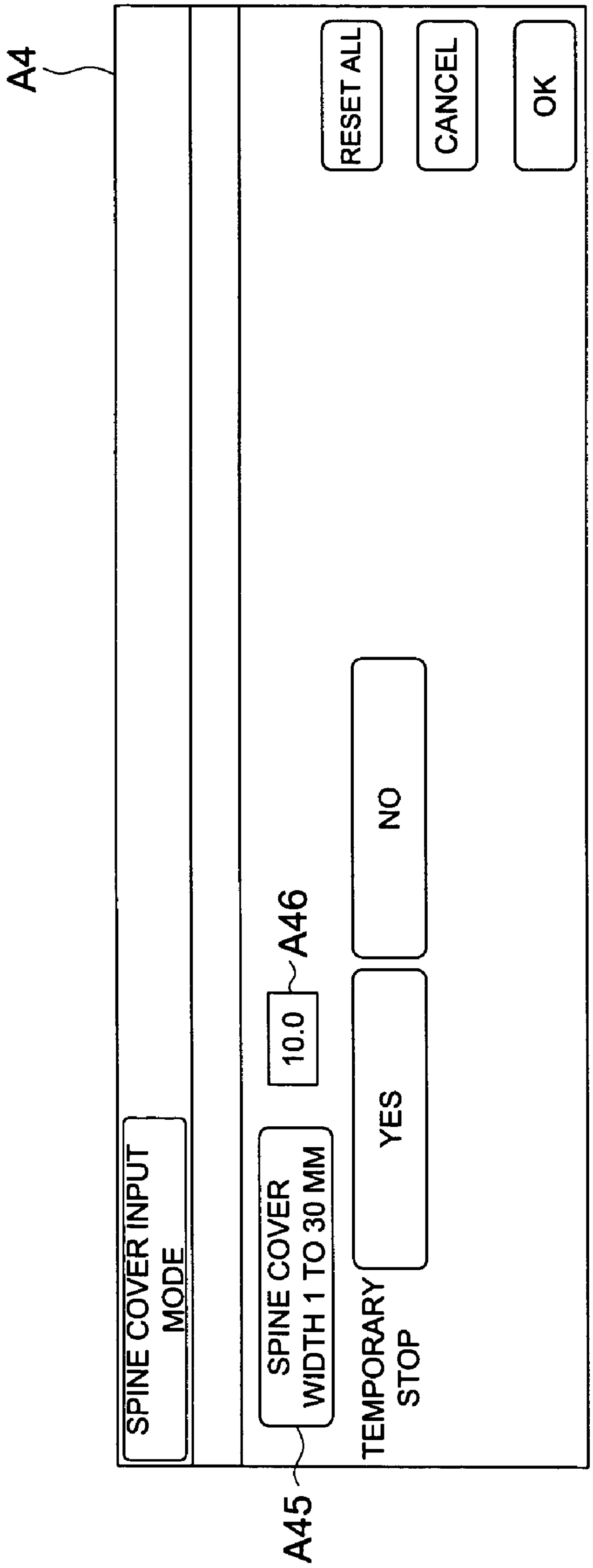
FIG. 14 is an explanatory diagram of the spine cover width input mode in the operation section A4.

The method of making the settings of the input mode is explained here referring to FIG. 8 and FIG. 14. A spine cover width input mode button A44 has been provided in the settings screen related to the settings for wrap-stitching shown in FIG. 8. When the spine cover width input mode button A44 is pressed, the settings screen related to the spine cover width input mode is displayed as is shown in FIG. 14. When the spine cover width button A45 is pressed, it is possible to input concretely a numeric value for the spine cover width, and the value of the spine cover width that has been input is displayed in the cover sheet window A46. In addition, it is also possible to set whether or not to stop temporarily the book binding operations in the image forming system in order to verify the wrapped book S3 that has been bound in the input mode.

Figure 15:
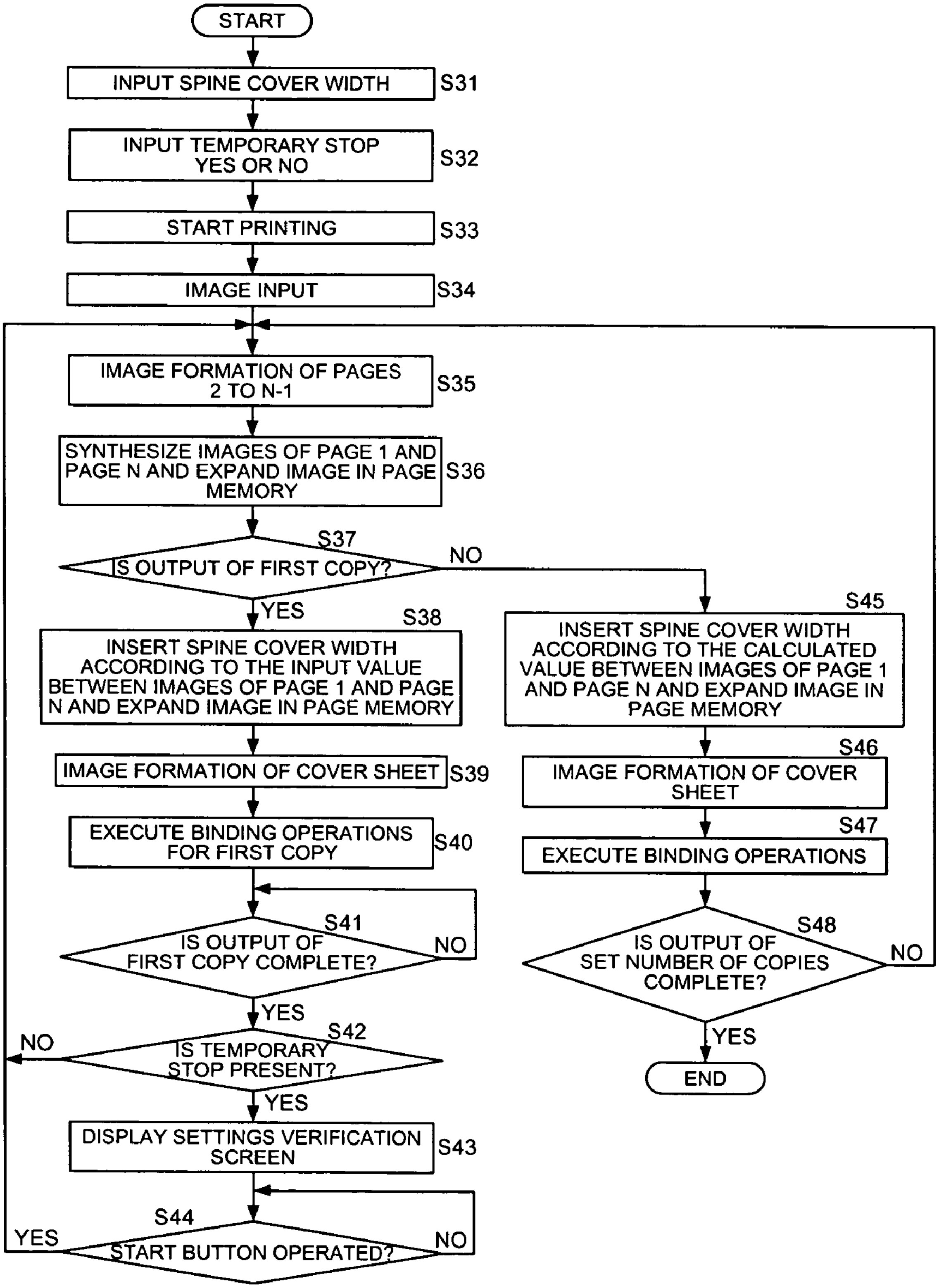
FIG. 15 is a flow chart showing the binding operations using the input mode and the measurement mode.

FIG. 15 is a flow chart showing the operations of binding using the input mode and the measurement mode.

To begin with, the spine cover width is entered in the screen of the spine cover width input mode shown in FIG. 14 (Step S31), and an input is made selecting whether or not to stop temporarily the book binding operations in the image forming system at the point when the first copy of the wrapped book S3 that has just been bound has been output (Step S32). Next, the printing operation is started (Step S33), when the image is input from the PC, etc. (Step S34), first the images of pages 2 to N-1 are formed on the sheets S1 (Step S35), and then the images of page 1 and page N are synthesized and expanded in the page memory (Step S36). Further, in case images are to be formed not only on the top surface of the cover sheet but also images are to be formed on the inside surfaces of the cover sheet, first the images of pages 3 to N-2 are formed on the sheets S1, next the images of page 1 and page N are synthesized, and finally, the images of page 2 and page N-1 are synthesized and expanded in the page memory. Thereafter, a judgment is made as to whether or not it is the output of the first copy of the book (Step S37), and if it is the output of the first copy, the spine cover width is inserted between the front cover sheet image and the back cover sheet image using the value of the spine cover width input in the operation section A4 (Step S38). Since the image in the cover sheet S2 gets completed when the spine cover width is inserted, the image forming is carried out on the cover sheet S2 based on this image (Step S39). Next, the binding operations such as coating the adhesive material, etc., are carried out (Step S40). Although not shown in the flow in FIG. 15, between steps S39 and S40, the thickness of the stack of sheets S1 is measured according to the method of measurement described regarding FIG. 11 and FIG. 12. In Step S41, a judgment is made as to whether or not the output of the first copy has been completed, and if it is judged that the output of the first copy has been completed, a judgment is made as to whether or not the temporary stop operation has been set in the operation section A4 (Step S42), and if temporary stop has not been set, the image forming system continues to carry out the output of the second and subsequent copies of the book without making a temporary stop of the operations. If a temporary stop has been set, the binding operations in the image forming system are stopped temporarily, the settings verification screen corresponding to that shown in FIG. 14 is displayed in the operation section A4 (Step S43), and the user is prompted to verify the finish of the wrapped book S3 prepared in the input mode. Thereafter, when the Start button is pressed (Step S44), the binding operations for the second and subsequent copies are restarted. At the time of executing the binding operations for the second and subsequent copies, since the thickness of the stack of sheets S1 has already been measured, the mode changes to the measurement mode, the spine cover width is inserted based on the result of that measurement (Step S45), and the image formation of the cover sheet (Step S46) and the binding operations are executed (Step S47). Further, for this spine cover width, it is possible to take a value equal to either the input value of the spine cover thickness or the measured value of the thickness of the stack of sheets S1 as the spine cover width in the cover sheet S2, or else, it is possible to take as the spine cover width a value obtained by adding to the input value of the spine cover width or the measured thickness of the stack of sheets S1 an amount corresponding to the thickness of the cover sheet S2 (for example, 0.1 mm to 2 mm).

In this manner, by carrying out binding operations for the first copy in the input mode, it is possible to achieve improvement in the productivity of producing the wrapped book S3, and since the operations are executed in the measurement mode of determining the spine cover width using the result of measurement of the thickness of the stack of sheets S1 for the second and subsequent copies, it is possible to form the front cover sheet image and the back cover sheet image at accurate positions in the cover sheet S2.

Further, there is the need that the user may want to prepare the final wrapped book S3 while confirming the finish after inputting the spine cover width. In this case, it is desirable that carry out binding operations that permit inputting the spine cover width several times.

Figure 16:
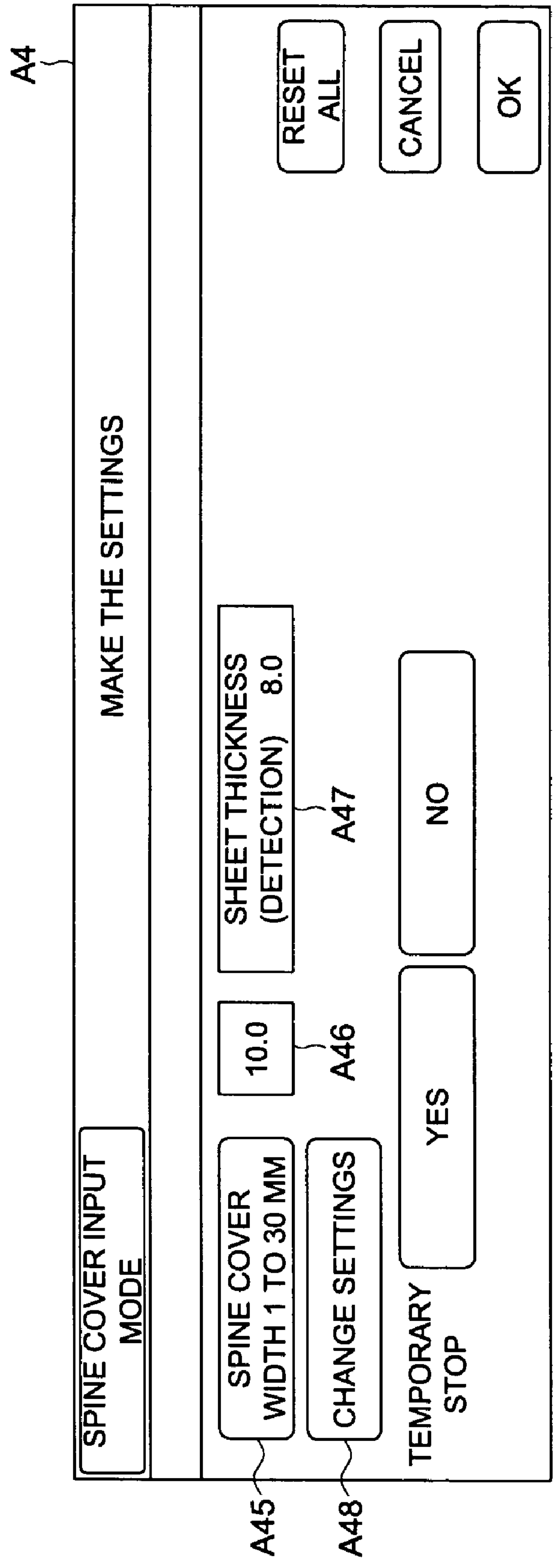
FIG. 16 is an explanatory diagram of the spine cover width input mode in the operation section A4.

FIG. 16 is an explanatory diagram of the spine cover width input mode in the operation section A4 which is different from that of FIG. 14.

When the spine cover width input mode button A44 is pressed in the settings screen related to the settings for wrap-stitching shown in FIG. 8, a settings screen is displayed as is shown in FIG. 16 which is different from that shown in FIG. 14. When the spine cover width button A45 is pressed, it is possible to input concretely a numeric value for the spine cover width, and the value of the spine cover width that has been input is displayed in the cover sheet window A46, which is identical to the case shown in FIG. 14, but a detection window A47 has been provided next to the cover sheet window A46. The result of measurement of the thickness of the stack of sheets S1 is displayed in this detection window A47, and it is possible to input again the spine cover width by pressing the spine cover width button A45 based on this displayed value. In addition, the Change Setting button A48, which is the button for inputting the value again, makes it possible to set the value of the result of measurement displayed in the detection window A47 as it is as the value of the spine cover width, and hence it becomes easy to set again the spine cover width. When the Change Setting button A48 is pressed, the values in the cover sheet window A45 and the detection window A47 become identical.

Figure 17:
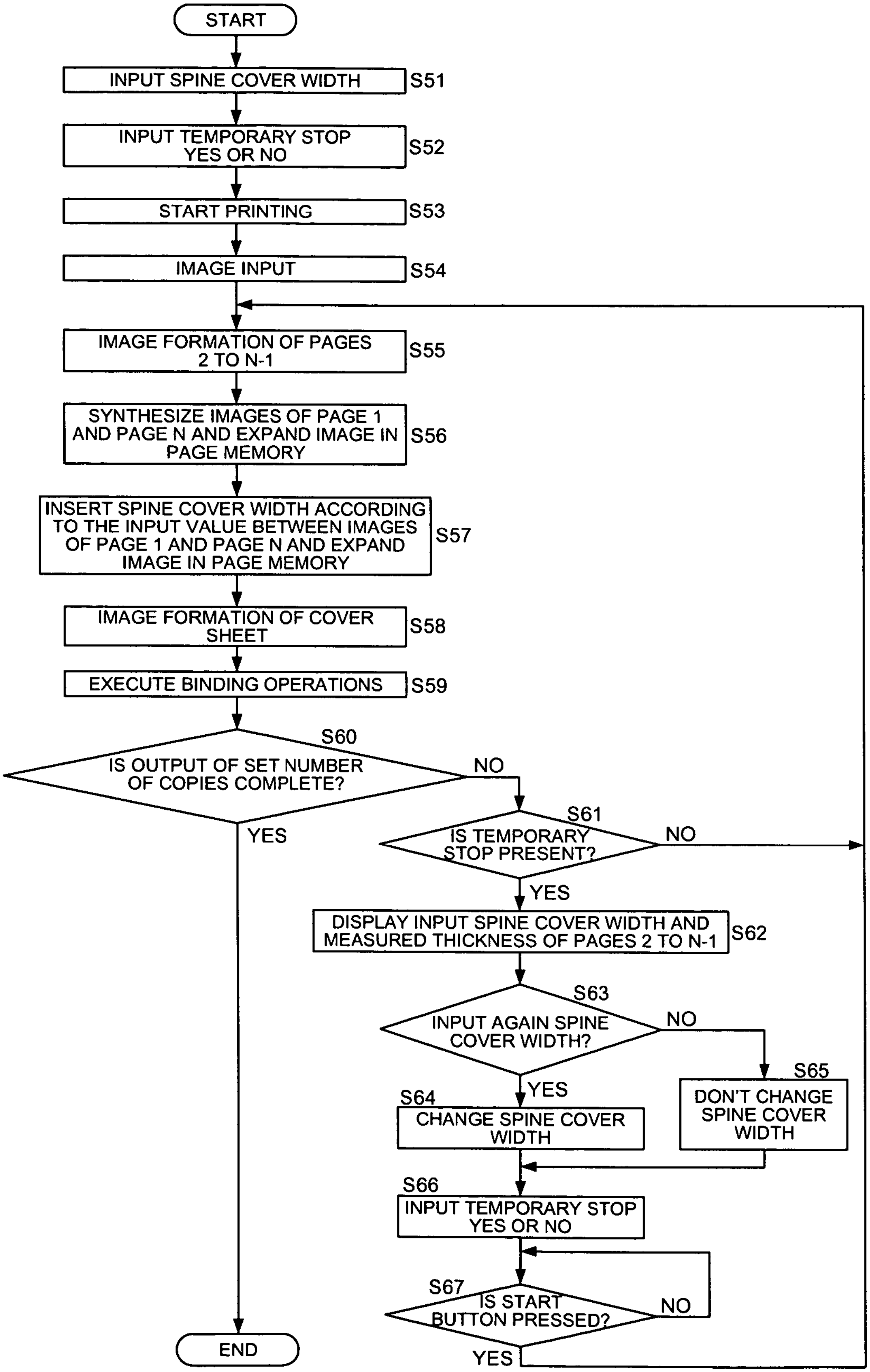
FIG. 17 is a flow chart showing the binding operations in which the spine cover width can be input again or can be set again.

FIG. 17 is a flow chart showing the binding operations in which the spine cover width can be input again or can be set again.

The operations in Steps S51 to S56 are identical to the operations of the Steps S31 to S36 described regarding FIG. 15. In Step S57, the spine cover width is inserted between the front cover sheet image and the back cover sheet image based on the value of the spine cover width input in the operation section A4. Since the image in the cover sheet S2 gets completed when the spine cover width is inserted, the image forming is carried out on the cover sheet S2 based on this image (Step S58). Next, the binding operations such as coating the adhesive material, etc., are carried out (Step S59), a judgment is made as to whether or not the output for the set number of copies has been completed (Step S60), and the binding operations are ended if it is judged that the output for the set number of copies has been completed. If it is judged that the output for the set number of copies has not been completed in Step S60, a judgment is made as to whether or not temporary stop is active (Step S61). If no temporary stop has been specified, the image forming system continues the binding operations for the next and subsequent copies. If a temporary stop has been specified, the spine cover width value that has been input and the result of measurement of the thickness of the stack of sheets S1 are displayed in the operation section A4 (Step S62), and the settings screen of FIG. 16 is displayed. Next, a judgment is made as to whether or not the spine cover width is to be input again after observing the wrapped book S3 that has actually been output (Step S63). When the spine cover width is input again by pressing the spine cover width button A45 or the Change Setting button A49, that value that has been input again is set as the spine cover width for the next and subsequent copies (Step S64), and if the spine cover width is not input again, the spine cover width that has already been input is set again as the spine cover width for the next and subsequent copies (Step S65). When the input of whether or not to make a temporary stop is made (Step S66) and then the Start button is pressed again (Step S67), the book binding operations are started in the image forming system. In this manner, the operations from Step S55 to Step S67 are repeated until the output for the set number of copies has been completed. Further, for this spine cover width, it is possible to take a value equal to either the input value of the spine cover thickness or the measured value of the thickness of the stack of sheets S1 as the spine cover width in the cover sheet S2, or else, it is possible to take as the spine cover width a value obtained by adding to the input value of the spine cover width or the measured thickness of the stack of sheets S1 an amount corresponding to the thickness of the cover sheet S2 (for example, 0.1 mm to 2 mm).

As has been explained above, by executing the binding operations shown in FIG. 17, it is possible to input the spine cover width several times, and it is possible for the user to input the spine cover width and verify the finish of the resultant wrapped book S3, and then to prepare the final wrapped book S3.

As is shown in FIG. 16, the result of measurement of the thickness of the stack of sheets S1 is displayed in the detection window A47, and it is possible to input again the spine cover width based on this displayed value by pressing the spine cover width button A45 (Step S63 in FIG. 17). At the time of inputting again the spine cover width, if the user inputs by mistake a value for the spine cover width that is far different from the result of measurement, the front cover sheet image and the back cover sheet image are formed at positions far different from the correct positions on the cover sheet S2, and hence the wrapped book that is output will be wasted. In view of this, it is desirable that an alarm is given to the user when the input value of the spine cover width is widely different from the result of measurement of the thickness of the stack of sheets S1.

Figure 18:
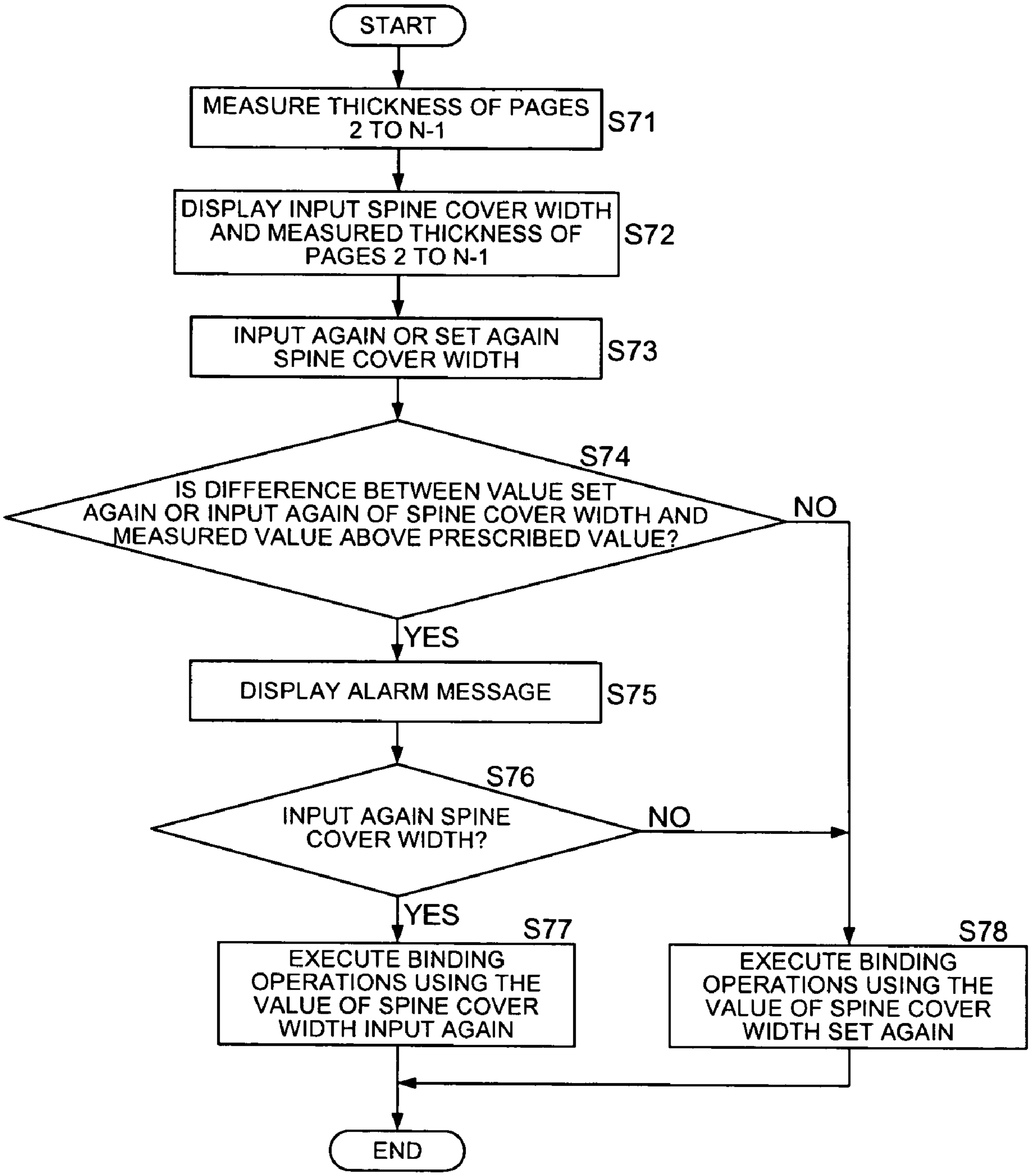
FIG. 18 is a flow chart describing the alarm operations at the time the spine cover width is input.

FIG. 18 is a flow chart describing the alarm operations at the time the spine cover width is input.

Figure 19:
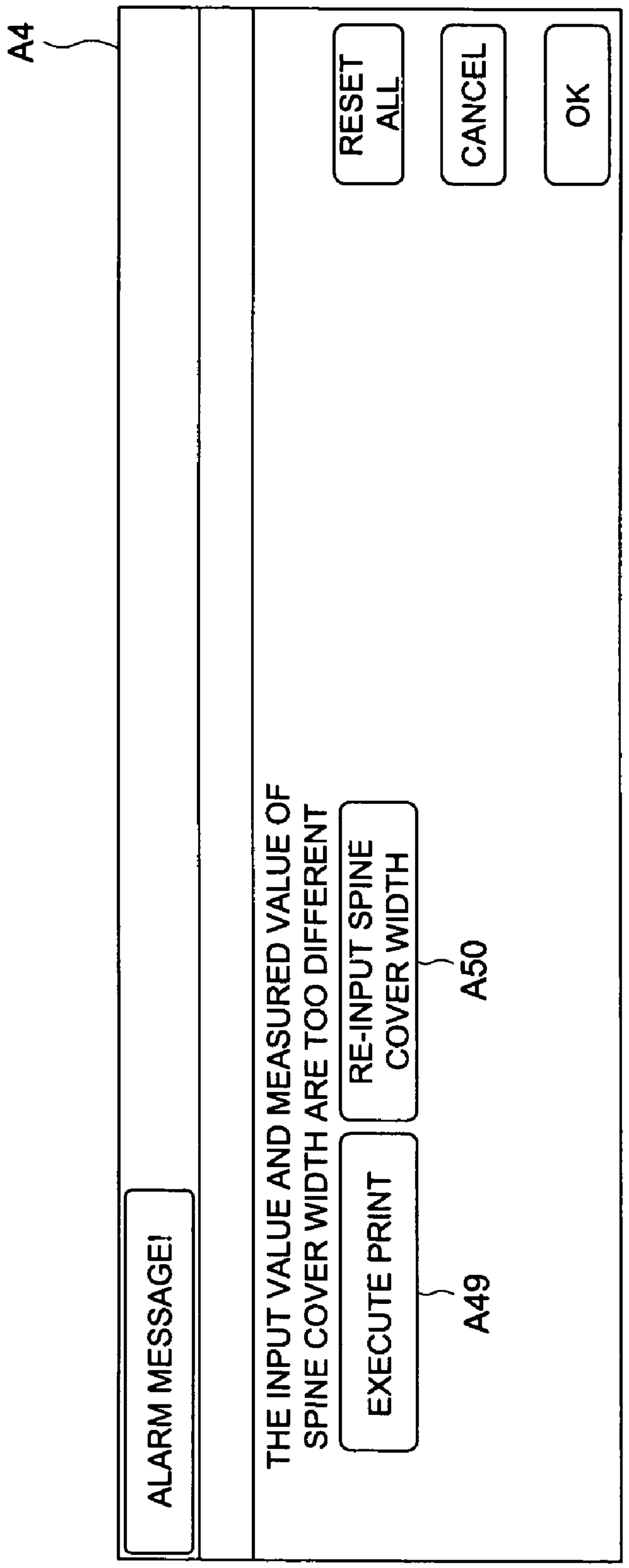
FIG. 19 is an explanatory diagram of the alarm messages in the operation section A4.

To begin with, the thickness of the stack of sheets S1 is measured using the method of measurement described regarding FIG. 11 and FIG. 12 (Step S71), and the spine cover width that has been input and the result of measurement of the stack of sheets S1 are displayed in the operation section A4 (Step S72). Thereafter, when the user inputs again or sets again the spine cover width using the operation section A4 (Step S73), the spine cover width value that has been input again or set again is compared with the thickness of the stack of sheets S1 that has been measured (Step S74). Although the binding operations are carried out if these are not different from each other by more than a prescribed value (Step S78), if they are different by more than the prescribed value, an alarm message is displayed in the operation section A4 as is shown in FIG. 19 (Step S75). Although in the present preferred embodiment the operation section A4 is functioning as an alarm section, it is also possible to emit an alarm sound. In addition, in case the alarm message is displayed by the operation section A4, it is also possible to make the display screen red in order to make the user realize the alarm. After the alarm message is output, a judgment is made as to whether or not the spine cover width is input or not (Step S76). As is shown in FIG. 19, the print execute button A49 and the Re-input spine cover width button A50 are displayed, and if the print execute button A49 is pressed, the binding operations are carried out as it is with the spine cover width value for which the alarm was generated (Step S78), and if the Re-input spine cover width button A50 is pressed, the settings screen shown in FIG. 16 is displayed thereby making it possible to set the spine cover width again. After the Re-input spine cover width button A50 button is pressed and the spine cover width has been set again, the binding operations are carried out with that spine cover width value that has been set again (Step S77).

By carrying out the operations shown in FIG. 18 in this manner, it is possible to give an alarm to the user if the input value of the spine cover width and the result of measurement of the thickness of the stack of sheets S1 are widely different, and hence it is possible to prevent the formation of a wrapped book S3 that becomes a waste.

Although the content of the present invention was explained in FIG. 3 to FIG. 17 based on an image forming system with a binding apparatus B and an image forming apparatus A connected together, similar results are provided even when the binding apparatus B and the image forming apparatus A are integral thereby constituting a single image forming apparatus. In other words, the present invention can be realized in a similar manner to that of an image forming system even in an image forming apparatus that is provided with a binding section and an image forming section.

What is claimed is:

1. An image forming system, comprising:

a binding section that generates a stack of sheets by accumulating a plurality of sheets and binds the stack of sheets by wrapping the stack of sheets with a cover sheet in a shape of a horizontal U;

an input section for inputting a value of a spine cover width;

a measurement section for measuring a thickness of the stack of sheets;

a spine cover width determining section for determining the spine cover width in the cover sheet by operating in either an input mode in which the spine cover width in the cover sheet is based on the value of the spine cover width inputted by said input section, or in a measurement mode in which the spine cover width in the cover sheet is based on the thickness of the stack of sheets measured by said measurement section;

an image forming section for forming a front cover image and a back cover image on the cover sheet, the front and back cover images separated by a spacing equal to the spine cover width; and a central processing unit including a control section for switching between the input mode and the measurement mode of said measurement section when a plurality of books are bound, wherein said control section judges whether or not it is the output of the first book of the plurality of books bound and controls spine cover determining operation by said spine cover width determining section by operating in the input mode when said control section judges it is the output of the first book, and operating in the measurement mode when the control section judges it is not the output of the first book.

2. The image forming system according to claim 1, wherein said control section carries out switching from the input mode to measurement mode after said measurement section measures the thickness of the stack of sheets.

3. The image forming system according to claim 1, wherein said control section temporarily stops an operation of the binding section after said measurement section measures the thickness of the stack of sheets.

4. The image forming system according to claim 1, further comprising:

a first gripping member for gripping the stack of sheets;

a second gripping member which is placed with an initial spacing from said first gripping member at a initial position; and a moving device for moving said second gripping member from the initial position;

wherein said measurement section measures the thickness of the stack of sheets by gripping the stack of sheets with said first gripping member and the second gripping member by operating said moving device.

5. The image forming system according to claim 4, further comprising:

a control section to execute measurement operation of measuring the initial spacing between said first gripping member and said second gripping member;

wherein said measuring section measures the thickness of the stack of sheets based on the initial spacing measured by said measurement operation and an amount of movement of the second gripping member from the initial position.

6. The image forming system according to claim 5, further comprising:

a memory section to store the initial spacing measured by said measurement operation;

wherein said measurement section measures the thickness of the stack of sheets based on the initial spacing read out from said memory section.

7. The image forming system according to claim 1, wherein said spine cover width determining section determines the thickness of the stack of sheets measured by said measurement section as a spine cover width in the cover sheet.

8. The image forming system according to claim 1, wherein said spine cover width determining section determines a value obtained by adding an amount corresponding to a thickness of the cover sheet to the measured thickness of the stack of sheets as a spine cover width in the cover sheet.

9. The image forming system according to claim 1, further comprising:

a control section for conveying the cover sheet from said image forming section to the binding section after conveying the plurality of sheets from said image forming section to the binding section.

* * * * *